United States Patent
Humele

(10) Patent No.: US 9,061,873 B2
(45) Date of Patent: Jun. 23, 2015

(54) DEVICE AND METHOD FOR PRODUCING PLASTIC CONTAINERS

(75) Inventor: Heinz Humele, Thalmassing (DE)

(73) Assignee: KRONES, AG, Neutraubling (DE)

( * ) Notice: Subject to any disclaimer, the term of this patent is extended or adjusted under 35 U.S.C. 154(b) by 951 days.

(21) Appl. No.: 13/129,309

(22) PCT Filed: Nov. 13, 2009

(86) PCT No.: PCT/EP2009/065086
§ 371 (c)(1),
(2), (4) Date: May 13, 2011

(87) PCT Pub. No.: WO2010/055113
PCT Pub. Date: May 20, 2010

(65) Prior Publication Data
US 2011/0219728 A1    Sep. 15, 2011

(30) Foreign Application Priority Data

Nov. 14, 2008 (DE) .......................... 10 2008 057 403

(51) Int. Cl.
*B65B 55/02* (2006.01)
*B65B 3/02* (2006.01)
(Continued)

(52) U.S. Cl.
CPC ................ *B67B 3/003* (2013.01); *B29C 43/00* (2013.01); *B29C 43/02* (2013.01); *B29C 43/56* (2013.01); *B29C 49/06* (2013.01); *B29C 49/36* (2013.01); *B29C 49/42* (2013.01); *B29C 65/028* (2013.01); *B29C 65/1425* (2013.01); *B29C 66/0018* (2013.01); *B29C 2035/0855* (2013.01); *B29C 2043/565* (2013.01); *B29C 2049/4697* (2013.01); *B29C 2791/001* (2013.01);
(Continued)

(58) Field of Classification Search
CPC ................ B67B 3/003; B67B 2201/08; B67C 7/0073–7/0086; B65B 3/022
USPC ........ 53/415, 135.1, 426, 167, 452, 561, 471, 53/281, 485, 487, 290, 425, 433, 476
See application file for complete search history.

(56) References Cited

U.S. PATENT DOCUMENTS 2,120,328 A * 6/1938 Ferngren ........................ 264/554
2,789,312 A * 4/1957 Borer ............................. 425/526
(Continued)

FOREIGN PATENT DOCUMENTS

DE     1111092     7/1961
DE     3009202     9/1981
(Continued)

OTHER PUBLICATIONS

International Search Report issued in related PCT application No. PCT/EP2009/065086.
(Continued)

*Primary Examiner* — Stephen F Gerrity
*Assistant Examiner* — Joy N Sanders
(74) *Attorney, Agent, or Firm* — Onello & Mello, LLP.

(57) ABSTRACT

A method for producing plastic containers includes feeding plastic preforms to a shaping unit, shaping the plastic preforms to plastic containers, and filling the plastic containers with a liquid. The method further includes closing the plastic containers with plastic closures, wherein the plastic closures are produced of a plastic material and are heated during the manufacturing process.

13 Claims, 1 Drawing Sheet

(51) Int. Cl.
   B67B 3/00   (2006.01)
   B29C 49/42  (2006.01)
   B67C 7/00   (2006.01)
   B29C 43/00      (2006.01)
   B29C 43/02      (2006.01)
   B29C 43/56      (2006.01)
   B29C 49/06      (2006.01)
   B29C 49/36      (2006.01)
   B29C 65/02      (2006.01)
   B29C 65/14      (2006.01)
   B29C 65/00      (2006.01)
   B29C 35/08      (2006.01)
   B29C 49/46      (2006.01)
   B29L 1/00       (2006.01)
   B29L 31/56      (2006.01)
   B67C 3/22       (2006.01)

(52) U.S. Cl.
   CPC ...... *B29C 2791/005* (2013.01); *B29L 2001/00* (2013.01); *B29L 2031/565* (2013.01); B67C 7/0073 (2013.01); *B67C 2003/227* (2013.01); *B29C 66/542* (2013.01)

(56) References Cited

U.S. PATENT DOCUMENTS

| | | | |
|---|---|---|---|
| 3,196,593 A | 7/1965 | Hey | |
| 3,398,427 A * | 8/1968 | John | 425/149 |
| 3,430,797 A * | 3/1969 | Goins | 215/321 |
| 3,828,522 A | 8/1974 | Ueda | |
| 3,830,893 A * | 8/1974 | Steingiser | 264/489 |
| 5,866,060 A * | 2/1999 | Buckley | 264/463 |
| 6,119,433 A | 9/2000 | Kitahora et al. | |
| 6,436,330 B1 | 8/2002 | Winter | |
| 2003/0001316 A1* | 1/2003 | Cargile et al. | 264/531 |
| 2005/0217211 A1* | 10/2005 | Py | 53/426 |
| 2008/0099961 A1* | 5/2008 | Feuilloley et al. | 264/405 |
| 2009/0286013 A1 | 11/2009 | Cook et al. | |
| 2010/0052224 A1 | 3/2010 | Humele et al. | |
| 2011/0104496 A1 | 5/2011 | Cook et al. | |

FOREIGN PATENT DOCUMENTS

| | | |
|---|---|---|
| DE | 19737697 | 3/1999 |
| DE | 19819731 | 11/1999 |
| EP | 0794903 | 9/1997 |
| JP | 60154044 | 8/1985 |
| WO | 9101213 | 2/1991 |
| WO | 9618541 | 6/1996 |
| WO | 9847770 | 10/1998 |
| WO | 2004060748 | 7/2004 |
| WO | 2007131701 | 11/2007 |
| WO | 2007140469 | 12/2007 |

OTHER PUBLICATIONS

Notice under Art 94 (3) EPC dated Oct. 22, 2012, issued in related European Application No. 09 752 177.7-1253.

* cited by examiner

DEVICE AND METHOD FOR PRODUCING PLASTIC CONTAINERS

TECHNICAL FIELD

The present application generally relates to a method and a device for producing plastic containers.

BACKGROUND

Methods for producing plastic containers have been known from the prior art for a long time. In this connection it is known that preforms are first heated by means of an oven and are then expanded into plastic containers using a blow moulding unit. After that, these containers are filled with a liquid such as, for example, a beverage and are finally closed with closures. For this purpose, plastic closures are usually also used as closures, which plastic closures are fed to a closing unit and are subsequently attached to the containers.

From DE 197 37 697 A1 an injection blow moulding machine is known, wherein the plastic blanks are initially moulded in injection moulding cavities and are then transferred by a transfer unit from the injection moulding cavities into a blow moulding unit. Thus, also the plastic performs are produced within the context of the production of the plastic containers and are subsequently expanded into containers.

From DE 198 19 731 A1 a method and a device for producing labelled plastic bottles are known. Here, the bottles are labelled in a continuous flow immediately upon leaving a blowing machine, and in this way labels can be reliably affixed at a high speed.

EP 0 794 903 B1 describes a system and a method for packaging beverages in a sterile way. In this method, too, the preforms are first produced within a sterile room and are subsequently expanded into containers. Further, also a sterilisation unit for the closure caps is provided, which is also disposed within said sterile room.

SUMMARY

It is the object of the present application to provide devices and methods for producing plastic containers, which allow the production process thereof to be rationalised even further.

In a method for producing plastic containers, plastic performs are first fed to a moulding unit. Thereafter, the plastic performs are moulded into plastic containers. In a further method step, the plastic containers are filled with a liquid and are finally closed with plastic closures. In the course of this process, the plastic closures are preferably produced from a plastics material and are heated during this production process.

It is therefore proposed that not only the containers themselves are produced by moulding, but also the plastic closures which subsequently close the containers are produced within the context of this process. In this way, the method can in its entirety be designed to be economical. By contrast, in the prior art the plastic closures are produced in an entirely separate process and in particular in different production systems. In the prior art, the closures thus produced are joined with the containers and/or screwed onto these. In the prior art therefore the closures used also have to be sterilised.

The production rate of the closures is preferably adapted to the production rate of the moulded or blown containers. In this way, a continuous production process for the containers provided with closures is achieved. In the case of a failure occurring, for example in the blow moulding unit, a control unit preferably causes the closure production process to be stopped or slowed down. Thus, a higher level control unit is preferably provided which controls the entire production process, i.e. in particular also the production of the closures.

Due to the heating of the plastic closure, the need for a sterilisation of said closure may at least partly be eliminated. In this way, too, the expenditure for the corresponding process is reduced. The moulding of the plastic performs is carried out here, as is known from the prior art, by a blow moulding process wherein the plastic preforms are expanded into the containers using pressurised air. In this way, a centralised (in particular single step) packaging process of a liquid into a container as well as the production thereof and preferably also the labelling and sterilisation thereof as well as the filling and closing thereof under particularly sterile conditions is suggested.

In a preferred method, the closure blank is moulded into the plastic closure by way of a microwave-based heating process. Here, the moulding process may for example be carried out by press forming. The high material temperatures which are necessary or advantageous for this cause at the same time the closure to be sterilised. It is to be noted here that due to several protrusions such as for example the internal thread of the closure, the sterilisation of the closure often is a complex process.

In a further advantageous process, the production of the plastic closure is carried out at least at times at temperatures which cause the plastic closure to be sterilised. Thus, it would advantageously also be possible to use slightly higher temperatures for the production of the plastic closures than for the actual moulding of the material, in order to achieve or promote the desired sterilisation effect.

In a further advantageous process, the plastic preforms are produced prior to being fed into the moulding unit. This means that not only the closures but also the containers or the preforms themselves are produced directly in the course of this process. In this way, a further simplification of the process is achieved. More specifically, it is possible in this connection to produce a preform from known materials such as for example PET, PP and the like in a continuously operating rotary injection moulding machine, which machine feeds these preforms (correctly tempered) preferably directly to a in a conventional stretch blow moulding process a blow moulding machine for further processing.

Thus, the plastic preforms are preferably heated within the context of their production process in such a way that they can be fed to a moulding unit immediately after the production thereof. In this way, any heating devices as used in the prior art for heating preforms may be dispensed with. In this case, too, it is possible for the preforms to be produced, if necessary, at higher temperatures than this would normally be necessary for the production thereof, in order to be able to eliminate the need for any downstream heating units for the preforms.

Further, owing to said production process it is also possible to dispense with any other sterilisation steps that might otherwise be necessary.

In a further preferred process, the plastic containers are labelled and are sterilised during this labelling process. Preferably, as mentioned above, the container is first generated from the preform in a usual stretch blow moulding process. After that, as mentioned above, labelling, for example by means of neck handling systems, and at the same time sterilising of the container in its empty condition may be carried out.

The advantage of this method consists in the fact that the containers are dry after the blow moulding process and in this dry condition they are suitable for the labelling process. Thus, it is possible here as well on the one hand to affix the label (to an outer wall of the container) and at the same time to sterilise the container (on the inner wall thereof). For the sterilisation process, an electron beam device such as a beam finger may be used, which is inserted into the container and is moved relative to the container during the sterilisation process. In this process it is both possible to move the beam finger and to move the container itself in its longitudinal direction. These simultaneous labelling and sterilisation processes, too, allow the number of components used to be reduced. However, it would also be possible to carry out the labelling process not until after the containers have been closed.

In a further preferred process, the closures are produced in a clean room. In this way it can be avoided that the produced closures are immediately contaminated again. Preferably, also the labelling process is carried out in a clean room, in particular in the case of those processes where the containers are labelled and sterilised at the same time.

After sterilisation of the empty containers, said containers are preferably filled with a (sterile) liquid and finally the containers are closed with a closure (which is preferably also sterile), which closure, as mentioned above, is produced in a parallel production process and is fed directly to the filled containers in order to subsequently close these (in a sterile manner).

Advantageously, the closures are produced using a pressing process. To this end, a plastics composition or a core can be inserted into a press mould and can then be moulded by a punch. After that, a cutting tool may be used to provide a thread. It would also be possible to additionally sterilise the closures during this forming operation, for example by means of hydrogen peroxide gas.

The present invention further relates to a device for producing plastic containers. This device includes a moulding unit which moulds plastic preforms into plastic containers. In addition, the device includes a filling unit disposed downstream of the moulding unit in the transport direction of the containers, which filling unit fills the plastic containers with a liquid, as well as a closing unit which closes the filled plastic containers with closures.

According to the invention, the device includes a closure production unit which produces the plastic closures from a plastics material. This closure production unit is preferably designed in such a way that it produces the plastic closures whilst heating the same.

In a further advantageous embodiment, the closure production unit includes a microwave-based heating unit which heats the plastic closures.

In a further advantageous embodiment, the device includes a first sterilisation unit that sterilises the plastic preforms. In this connection it is possible for this sterilisation to be carried out immediately after the production of the plastic preforms, i.e. even prior to the blow moulding operation. A further sterilisation process may be carried out after the production of the plastic containers or during the moulding process.

The device further includes a labelling unit which labels the plastic containers. This labelling unit can, as mentioned above, be implemented here together with a sterilisation unit. Thus, the containers may be transported for example by their necks using gripping claws and may be externally labelled and internally sterilised in the process. In doing so it is possible to rotate the containers about their own axis both for the purpose of sterilising and for the purpose of labelling them.

In a further advantageous embodiment, the device includes a preform production unit that produces the preforms from a plastics material.

In a further advantageous embodiment, the device includes a sterile room, within which at least the filling unit, the closing unit and the closure production unit are arranged. Preferably, also a unit for producing the preforms as well as one or more sterilisation units are arranged within the sterile room.

In one aspect, a method for producing plastic containers, comprises the following steps: feeding plastic preforms (10) to a blowing (4) for moulding plastic preforms unit; moulding said plastic preforms (10) into plastic containers (20) by a blowing unit (4); filling the plastic containers (20) with a liquid; closing the plastic containers (20) with plastic closures (15); characterised in that the plastic closures are produced from a plastics material and are heated during this production process, wherein at least a filling unit (8), a closing unit (12) and a closure production unit (3) are arranged in a clean room (25) and wherein a production rate of the closures is adapted to a production rate of the moulded or blown containers.

In some embodiments, the method is characterised in that a closure blank is moulded into the plastic closure (15) by way of a microwave-based heating process.

In some embodiments, the method is characterised in that the production of the plastic closure is carried out at least at times at temperatures which cause the plastic closure to be sterilised.

In some embodiments, the method is characterised in that the plastic preforms are produced prior to being fed into the blowing unit (4).

In some embodiments, the method is characterised in that the plastic preforms (10) are heated within the context of the production process thereof in such a way that they can be fed to a blowing unit (4) immediately after the production thereof.

In some embodiments, the method is characterised in that the plastic containers (20) are labelled and are sterilised during this labelling process.

In some embodiments, the method is characterised in that the production of the closures (15) is carried out in a clean room (25).

In some embodiments, the method is characterised in that the closures (15) are produced by way of a pressing process.

In another aspect, a device for producing plastic containers, comprises a blowing unit (4) which moulds plastic preforms (10) into plastic containers (20), a filling unit (8) disposed downstream of the blowing unit (4) in a transport direction of the plastic containers (20), which filling unit (20) fills the plastic containers (20) for example with a liquid, and a closing unit (12) which closes the filled plastic containers (20) with closures (15), characterised in that the device includes a closure production unit (30) which produces the plastic closures (15) from a plastics material and includes a clean room (25) within which at least the filling unit (8), the closing unit (12) and the closure production unit (30) are arranged, wherein a production rate of the closures is adaptable to a production rate of the blown containers.

In some embodiments, the device is characterised in that the closure production device (30) includes a microwave-based heating unit (32) which heats the plastic closures (15).

In some embodiments, the device is characterised in that the device includes a first sterilisation unit (5) which sterilises the plastic preforms (10).

In some embodiments, the device is characterised in that the device includes a labelling unit (18) that labels the plastic containers (20).

In some embodiments, the device is characterised in that the device includes a preform production unit (3) that produces the preforms (10) from a plastics material.

In another aspect, a method for producing plastic containers, comprises the steps of: (a) feeding plastic preforms to a blow moulding unit; (b) moulding the plastic preforms into plastic containers at the blow moulding unit; (c) filling the plastic containers with a liquid at a filling unit; and (d) closing the plastic containers with plastic closures at a closing unit, wherein the plastic closures are produced from a plastics material and are heated during steps (a) through (d) at a closure production unit, wherein the filling unit, the closing unit and the closure production unit are arranged in a clean room, and wherein a production rate of the closures is adapted to a production rate of the moulded containers.

In some embodiments, producing the plastic closures includes moulding closure blanks into the plastic closures by way of a microwave-based heating process.

In some embodiments, producing the plastic closures is carried out at times and temperatures which cause the plastic closures to be sterilised.

In some embodiments, the method further comprises producing the plastic preforms from a supply of plastics material prior to feeding the plastic preforms to the blow moulding unit.

In some embodiments, during producing the plastic preforms, the plastic preforms are heated to a temperature such that the plastic preforms are fed directly to the blow moulding unit immediately after the production of the plastic preforms.

In some embodiments, the method further comprises the step of: (e) labelling the plastic containers, wherein the plastic containers are sterilised during step (e).

In some embodiments, the closures are produced by way of a pressing process.

In some embodiments, the production rate of the closures is synchronized with the production rate of the moulded containers.

In another aspect, a device for producing plastic containers, comprises: a blow moulding unit that moulds plastic preforms into plastic containers; a filling unit disposed downstream of the blow moulding unit in a transport direction of the plastic containers, the filling unit configured to fill the plastic containers with a liquid; a closing unit that closes the filled plastic containers with closures; and a closure production unit that produces the plastic closures from a plastics material, wherein the filling unit, the closing unit and the closure production unit are configured to be placed in a same clean room, and wherein a production rate of the closures is adaptable to a production rate of the plastic containers.

In some embodiments, the closure production unit includes a microwave-based heating unit that is constructed and arranged to heat the plastic closures.

In some embodiments, the device further comprises a first sterilisation unit that sterilises the plastic preforms.

In some embodiments, the device further comprises a labelling unit that is configured to label the plastic containers.

In some embodiments, the device further comprises a preform production unit that is constructed and arranged to produce the preforms from a plastics material. In some embodiments, the filling unit, the closing unit and the closure production unit are arranged in the same clean room.

BRIEF DESCRIPTION OF THE DRAWINGS

Further advantages and embodiments will become evident from the attached drawings, wherein.

DESCRIPTION

Figure 1:
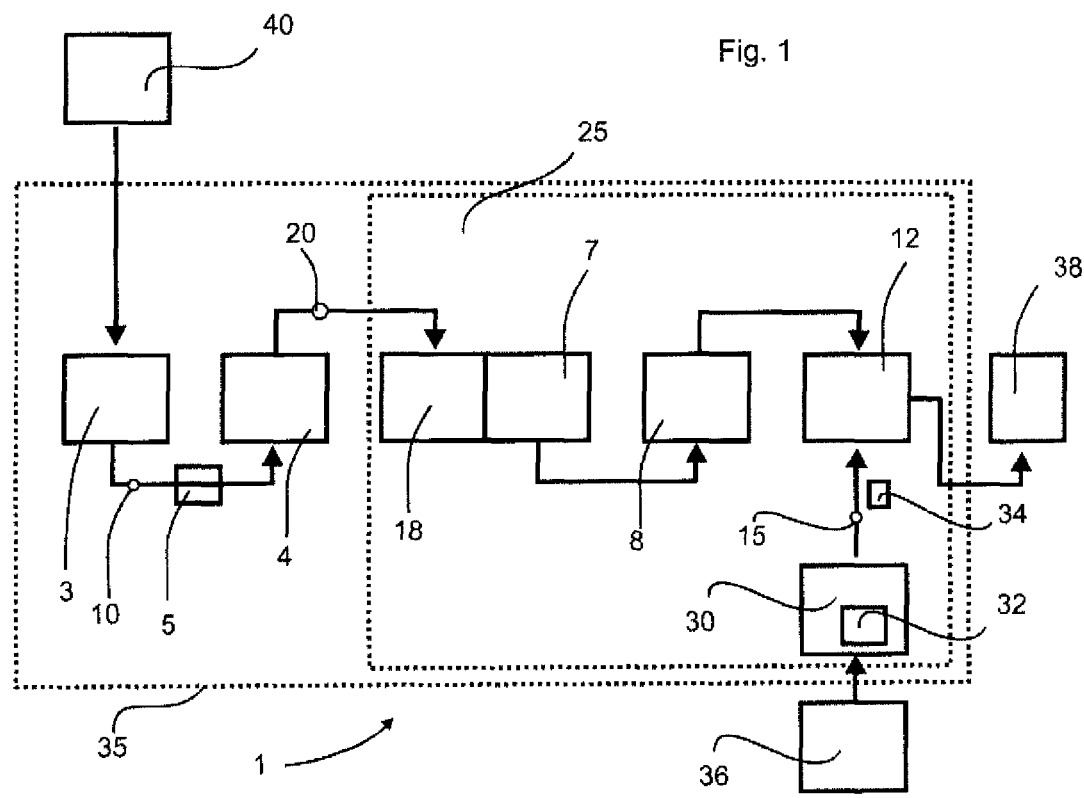
FIG. 1 shows a block diagram illustrating a first embodiment of a device.

FIG. 1 shows a block diagram of a first embodiment of a device 1. Here, reference numeral 3 identifies a unit for producing plastic preforms. In this connection it is possible that that unit for producing plastic preforms 3 includes a rotary injection moulding machine, into which plastics material is introduced, from which it produces preforms 10. The preforms 10 produced in this way may be passed on to a blow moulding unit 4, where they may be expanded into plastic containers 20 in the blow moulding unit 4. Reference numeral 5 relates here to a sterilisation unit that sterilises the plastic preforms 10 produced, and in particular may sterilize an interior of the plastic preforms 10. The sterilisation unit 5 may use electron beams or UV radiation for sterilising the walls of the plastic preforms 10. In this manner, the unit for producing plastic preforms 3 may deliver the produced plastic preforms 10 immediately to the blow moulding unit 4.

Reference numeral 40 refers to a supply for a plastics material that is introduced into the production unit 3. In the embodiment shown in FIG. 1, the containers 20 produced in this way may be then transferred to a labelling unit 18 and may be provided with labels on the outside thereof. In the same section of the machine, a sterilisation unit 7 may also be provided, which can sterilises the interior of the containers 10. In this way it is possible to label the containers and at the same time to sterilise the interior thereof in the area of the two system sections 18 and 7. Further, a heating unit may also be provided between the production unit 3 and the blow moulding unit 4, which heating unit tempers the preforms so as to facilitate in this way the actual blow moulding process. However, it is also possible for the production unit 3 itself to generate an appropriate temperature for the preforms, so that these can be directly transferred to the moulding process in the blow moulding unit 4.

In this connection it is possible that the blow moulding unit 4, too, includes a transport carousel and the preforms are transferred directly from the production unit 2 to the blow moulding unit 4. However, it is also possible that a further conditioning circuit in which, as mentioned above, the containers are for example heat treated, is provided between the production unit 3 and the blow moulding unit 4.

The labelling and sterilisation units 18 and 7 are followed by a filling unit 8 for filling the containers, in which the filling unit 8 may fill the containers 20 with a liquid and in particular with a beverage. This beverage is here preferably also sterile. Subsequently, the containers 20 are closed in a closing unit 12 and may be finally passed on to a packaging unit 38, in which the containers 20 are packaged together to form larger groups.

Reference numeral 36 relates to a supply for a plastics material to be used for producing the closures 15. Reference numeral 30 refers to a corresponding closure production unit in which closures 15 are produced from the material. This closure production unit may include a heating unit 32 that heats the closures 15. The closures 15 produced are preferably heated in such a way that additional sterilisation thereof is no longer necessary. However, a further sterilisation unit 34, which may additionally sterilise the closures 15 may also be provided.

Moreover, sterilisation units could also be provided between the sterilisation unit 7 and the filling unit 8. Reference numeral 25 relates to a sterile room in which in the embodiment shown in FIG. 1, both the labelling unit 18 and the sterilisation unit 7 and the filling unit 8 as well as the closing unit 12 are arranged. The individual machines 3, 4, 18, 7, 8, 12 are preferably interlocked and/or synchronised with each other as indicated by box 35. Apart from that it would also be possible to create further sterile rooms, for example with a higher degree of sterilisation, within the sterile room 25 shown, in order to run some sub-processes of the production in this higher degree of sterilisation, such as for example the filling process.

The device preferably includes a plurality of transfer or transport stars which transport the containers between the individual units 3, 4, 18, 8. In this way, the containers 10, 20 are passed individually or one by one through the entire device 1. The closures 15 may also be conveyed one after the other, e.g. in an accumulation or feeding section.

Figure 2:
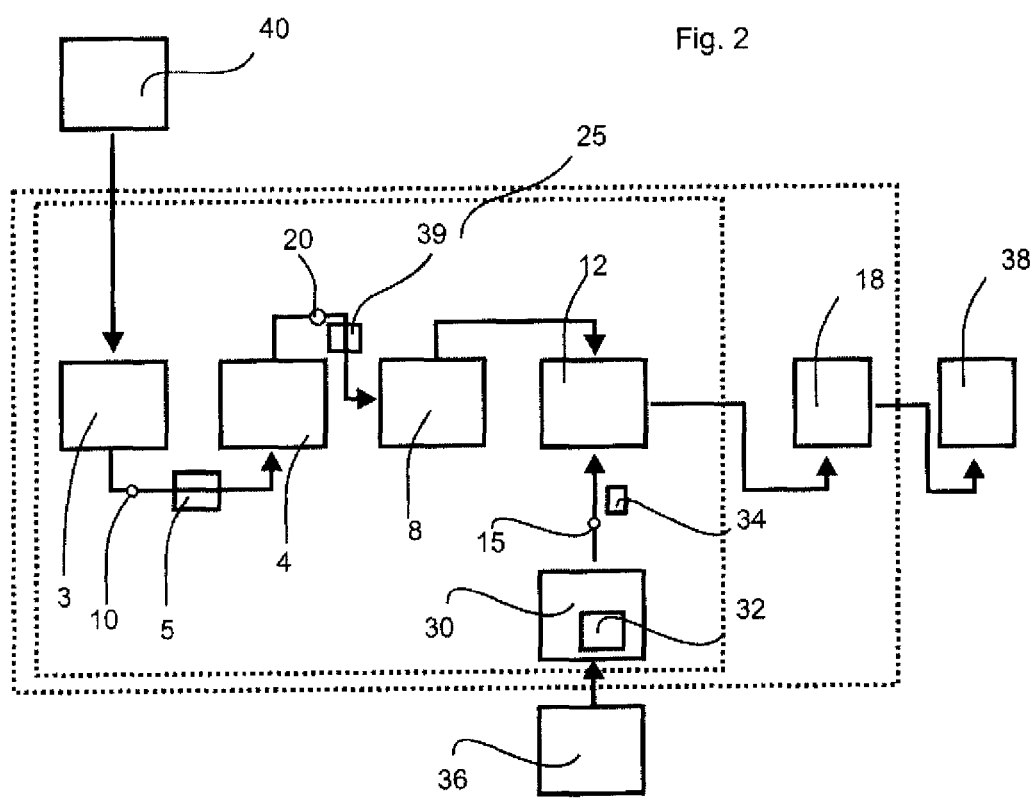
FIG. 2 shows a block diagram illustrating a second embodiment of a device.

FIG. 2 shows a further embodiment of a device 1. The difference in comparison with the embodiment shown in FIG. 1 is in the arrangement of the individual treatment units. In the embodiment shown in FIG. 2, first preforms 10 and then containers 20 are produced, which are subsequently filled and closed and are not labelled until in a subsequent step. In this connection, a sterilisation unit 39 is provided between the blow moulding machine 4 and the filling unit 8.

However, here too the closures 15 may be produced in a sterile room 25, but unlike in the embodiment shown in FIG. 1, the labelling process of the (filled) containers is here carried out outside of the sterile room 25 and thus on containers that have already been filled and/or closed. However, also in the case of the embodiment shown in FIG. 2, the containers 20 are finally packaged. In the case of the embodiment shown in FIG. 2, the synchronisation corresponds to the variant shown in FIG. 1. Here, too, it would be conceivable that only the preforms 10 and possibly the produced containers 20 are sterilised, which is advantageous in so far as the preforms have a smaller surface area than the containers 20.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

The invention claimed is:

1. A method for producing plastic containers, comprising the steps of:
   (a) feeding plastic preforms to a blow moulding unit;
   (b) moulding the plastic preforms into plastic containers at the blow moulding unit;
   (c) filling the plastic containers with a liquid at a filling unit; and
   (d) closing the plastic containers with plastic closures at a closing unit after filling the plastic containers with the liquid,
   wherein the plastic closures are produced from a plastics material and are heated during steps (a) through (d) at a closure production unit, wherein producing the plastic closures includes moulding closure blanks into the plastic closures by performing a heating process that includes microwave energy directed at the closure blanks,
   wherein producing the plastic closures is carried out at times and temperatures which cause the plastic closures to be sterilized,
   wherein a temperature at which the plastic closures are produced is higher than a temperature at which the plastic performs are moulded into the plastic containers,
   wherein the filling unit, the closing unit and the closure production unit are arranged in a clean room, and
   wherein a production rate of the closures is adapted to a production rate of the moulded containers.

2. The method of claim 1 further comprising producing the plastic preforms from a supply of plastics material prior to feeding the plastic preforms to the blow moulding unit.

3. The method of claim 2, wherein during producing the plastic preforms, the plastic preforms are heated to a temperature such that the plastic preforms are fed directly to the blow moulding unit immediately after the production of the plastic preforms.

4. The method of claim 1 further comprising the step of:
   (e) labelling the plastic containers,
   wherein the plastic containers are sterilised during step (e).

5. The method of claim 1, wherein the closures are produced by way of a pressing process.

6. The method of claim 1, wherein the production rate of the closures is synchronized with the production rate of the moulded containers.

7. The method of claim 1, wherein the plastics material for producing the closures is stored outside of the clean room.

8. The method of claim 1, further comprising subsequently closing the containers by the closing unit, the containers arranged separately from the blow moulding unit.

9. A device for producing plastic containers, comprising:
   a blow moulding unit that moulds plastic preforms into plastic containers;
   a filling unit disposed downstream of the blow moulding unit in a transport direction of the plastic containers, the filling unit configured to fill the plastic containers with a liquid;
   a closing unit that closes the filled plastic containers with closures after filling the plastic containers with the liquid; and
   a closure production unit that produces the plastic closures from a plastics material,
   wherein the filling unit, the closing unit and the closure production unit are configured to be placed in a same clean room, and
   wherein a production rate of the closures is adaptable to a production rate of the plastic containers,
   wherein the closure production unit includes a microwave-based heating unit that is constructed and arranged to direct microwave energy at closure blanks moulded into the plastic closures, and
   wherein a temperature at which the plastic closures are produced is higher than a temperature at which the plastic performs are moulded into the plastic containers.

10. The device of claim 9 further comprising a first sterilisation unit that sterilises the plastic preforms.

11. The device of claim 9 further comprising a labelling unit that is configured to label the plastic containers.

12. The device of claim 9 further comprising a perform production unit that is constructed and arranged to produce the preforms from a plastics material.

13. The device of claim 9, wherein the filling unit, the closing unit and the closure production unit are arranged in the same clean room.

* * * * *